United States Patent
Cain

(10) Patent No.: US 11,468,340 B2
(45) Date of Patent: Oct. 11, 2022

(54) METHOD AND SYSTEM FOR USING DATA STORAGE TECHNOLOGY AS A REPOSITORY OF FUNCTIONAL LOGIC KNOWLEDGE FOR USE IN A KNOWLEDGE ABSTRACTION LAYER SUBSYSTEM

(71) Applicant: Xerox Corporation, Norwalk, CT (US)

(72) Inventor: Randy Lee Cain, Oak Point, TX (US)

(73) Assignee: Xerox Corporation, Norwalk, CT (US)

( * ) Notice: Subject to any disclaimer, the term of this patent is extended or adjusted under 35 U.S.C. 154(b) by 970 days.

(21) Appl. No.: 14/930,268

(22) Filed: Nov. 2, 2015

(65) Prior Publication Data

US 2016/0232447 A1    Aug. 11, 2016

Related U.S. Application Data

(60) Provisional application No. 62/113,582, filed on Feb. 9, 2015.

(51) Int. Cl.
*G06N 5/02* (2006.01)

(52) U.S. Cl.
CPC .................. *G06N 5/022* (2013.01)

(58) Field of Classification Search
CPC .. G06N 5/022; G06F 16/2228; G06F 16/2453
USPC ......................................................... 707/705
See application file for complete search history.

(56) References Cited

U.S. PATENT DOCUMENTS

| | | | |
|---|---|---|---|
| 6,269,473 B1 | 7/2001 | Freed et al. | |
| 7,395,254 B2 | 7/2008 | Gu et al. | |
| 8,370,128 B2 | 2/2013 | Brun et al. | |
| 8,660,973 B1 | 2/2014 | Feigenbaum | |
| 8,705,080 B2 | 4/2014 | Shepherd et al. | |
| 8,818,930 B2* | 8/2014 | Yanase ............. | G06F 17/30997 706/50 |
| 9,336,192 B1* | 5/2016 | Barba ................ | G06F 40/30 |
| 2012/0150920 A1 | 6/2012 | Roulland et al. | |
| 2013/0232143 A1 | 9/2013 | Ait-Mokhtar | |
| 2014/0288920 A1 | 9/2014 | Proux | |
| 2015/0029034 A1* | 1/2015 | Abbassian ........... | E21B 44/00 340/853.2 |
| 2015/0281401 A1* | 10/2015 | Le ........................ | G06F 9/547 709/203 |

FOREIGN PATENT DOCUMENTS

WO    WO 98/57279    12/1998

* cited by examiner

*Primary Examiner* — Allen S Lin
(74) *Attorney, Agent, or Firm* — Fay Sharpe LLP

(57) ABSTRACT

This disclosure provides a knowledge base system and method for curating both factual and logical knowledge while using a common data storage repository. According to an exemplary embodiment, a knowledge base stores complied Boolean information which represents factual knowledge and logic for interpreting the factual knowledge. Combining the knowledge base, i.e., functional logic knowledge (FLK) repository, with a logic evaluator creates a knowledge abstraction layer.

4 Claims, 8 Drawing Sheets

- RTS
    - LOCATION
    - EXCLUSION
        - RULES
    - RULES
- FACILITIES
    - AVAILABILITY
        - RULES
- MACHINE
    - LOCATION
- HUMAN_RESOURCES
- POLICY
    - CORPORATE
        - SERVICE HOURS
- ADMIN
    - BILLING
        - DO_NOT_SERVICE
- PRODUCT
    - DISCONTINUED
- CONTEXT
    - FACTS
        - CALENDAR

FIG. 4

- Subject
  - External
    - Asset
    - User
  - Internal
    - Asset
    - User

METHOD AND SYSTEM FOR USING DATA STORAGE TECHNOLOGY AS A REPOSITORY OF FUNCTIONAL LOGIC KNOWLEDGE FOR USE IN A KNOWLEDGE ABSTRACTION LAYER SUBSYSTEM

BACKGROUND

Computer programs require specific knowledge about many different things in order to take appropriate action. Existing technology does a good job at storing and retrieving factual knowledge as data. But, logical knowledge, i.e., where knowledge equates to the necessary and sufficient conditions for justified belief, continues to be encoded as algorithms and continues to be sequestered into program code, severely limiting its scope and flexibility.

Internally, computer programs use combinational logic (Boolean) operations to control their operation. So, when data is needed, it is frequently acquired by retrieving it from datastores and almost always interpreting and converting it into those binary Boolean values that represent that data's significance before the logic knowledge contained within the algorithms can utilize it.

The result is that the full scope of knowledge is never curated in a common repository or interrelated in a common way and cannot therefore be evaluated as a whole, i.e., the factual data isn't usable, the logical knowledge isn't made readily available and inferring new facts from the data is very difficult.

As a consequence, domain knowledge is segmented, mostly uninterpreted, frequently redundant and inconsistent. The design of programs that need that knowledge, as well as the maintenance and reuse of that knowledge, is much more difficult than it needs to be, resulting in elevated system costs and decreased reliability.

A Knowledge Abstraction Layer would store factual knowledge and logical knowledge together and provide a way to query that knowledge and infer new facts beyond those already known to be true because of the stored logic. A Knowledge Abstraction Layer would, by virtue of the combined storage of factual and logical knowledge, be naturally "self-sufficient" and independent of other systems such that it could be utilized by many other systems. As a result, a Knowledge Abstraction Layer could be used by any system to answer any question in any domain over which it had factual and logical knowledge.

INCORPORATION BY REFERENCE

U.S. Pat. No. 8,818,930, issued Aug. 26, 2014, by Yanase and entitled "KNOWLEDGE BASE SYSTEM, LOGIC OPERATION METHOD, PROGRAM, AND RECORDING MEDIUM";

U.S. Pat. No. 6,269,473, issued Jul. 31, 2001, by Freed et. al. and entitled "METHOD AND APPARATUS FOR THE DEVELOPMENT OF DYNAMICALLY CONFIGURABLE SOFTWARE SYSTEMS";

U.S. Patent Publication No. 2014/0288920, published Sep. 25, 2014, by Proux and entitled "ASSISTED UPDATE OF KNOWLEDGE BASE FOR PROBLEM SOLVING";

U.S. Patent Publication No. 2013/0232143, published Sep. 5, 2013, by Ait-Mokhtar and entitled "EFFICIENT KNOWLEDGE BASE SYSTEM"; and WO 98/57279, Published Dec. 17, 1998, University of Maryland, and entitled "KNOWLEDGE REPRESENTATION SYSTEM INCLUDING INTEGRATED KNOWLEDGE-BASE AND DATABASE, AND METHOD AND APPARATUS FOR UTILIZING THE SAME", are incorporated herein by reference in their entirety.

BRIEF DESCRIPTION

In one embodiment of this disclosure, described is a knowledge abstraction layer system comprising: a memory which stores a knowledge base and knowledge base management system which includes instructions for at least one of adding instances to the knowledge base, querying the knowledge base and inferencing over the knowledge base; and a processor configured to execute the instructions, wherein the knowledge base is configured as a functional logic knowledge (FLK) repository, the FLK repository including a plurality of instances, each instance including one of a subject instance identifying an entity, an observation instance providing an external truth specified as true or false, and a gate instance specifying one of a plurality of Boolean logic operations to be performed by an evaluator on zero or more specified other instances to provide a true or false output.

In another embodiment of this disclosure, described is a method for generating a knowledge abstraction layer system comprising: providing in a memory a knowledge base including a functional logic knowledge (FLK) repository, the FLK repository including a plurality of instances, each instance including one of a subject instance identifying an entity, an observation instance providing an external truth specified as a true or false, and a gate instance specifying one of a plurality of Boolean logic operations to be performed by an evaluator on zero or more specified other instances to provide a true or false output.

In still another embodiment of this disclosure, described is a knowledge abstraction layer system comprising: a memory including a knowledge base, the knowledge base configured as a functional logic knowledge (FLK) repository, the FLK repository including a plurality of instances, each instance including one of a subject instance identifying an entity, an observation instance providing an external truth specified as true or false, and a gate instance specifying one of a plurality of Boolean logic operations to be performed on zero or more other instances specified by the gate instance; and an evaluator configured to perform a logic evaluation of the knowledge base based on a query.

BRIEF DESCRIPTION OF THE DRAWINGS

FIG. 4 is an example of a hierarchical taxonomy naming convention according to an exemplary embodiment of this disclosure.

DETAILED DESCRIPTION

Figure 1:
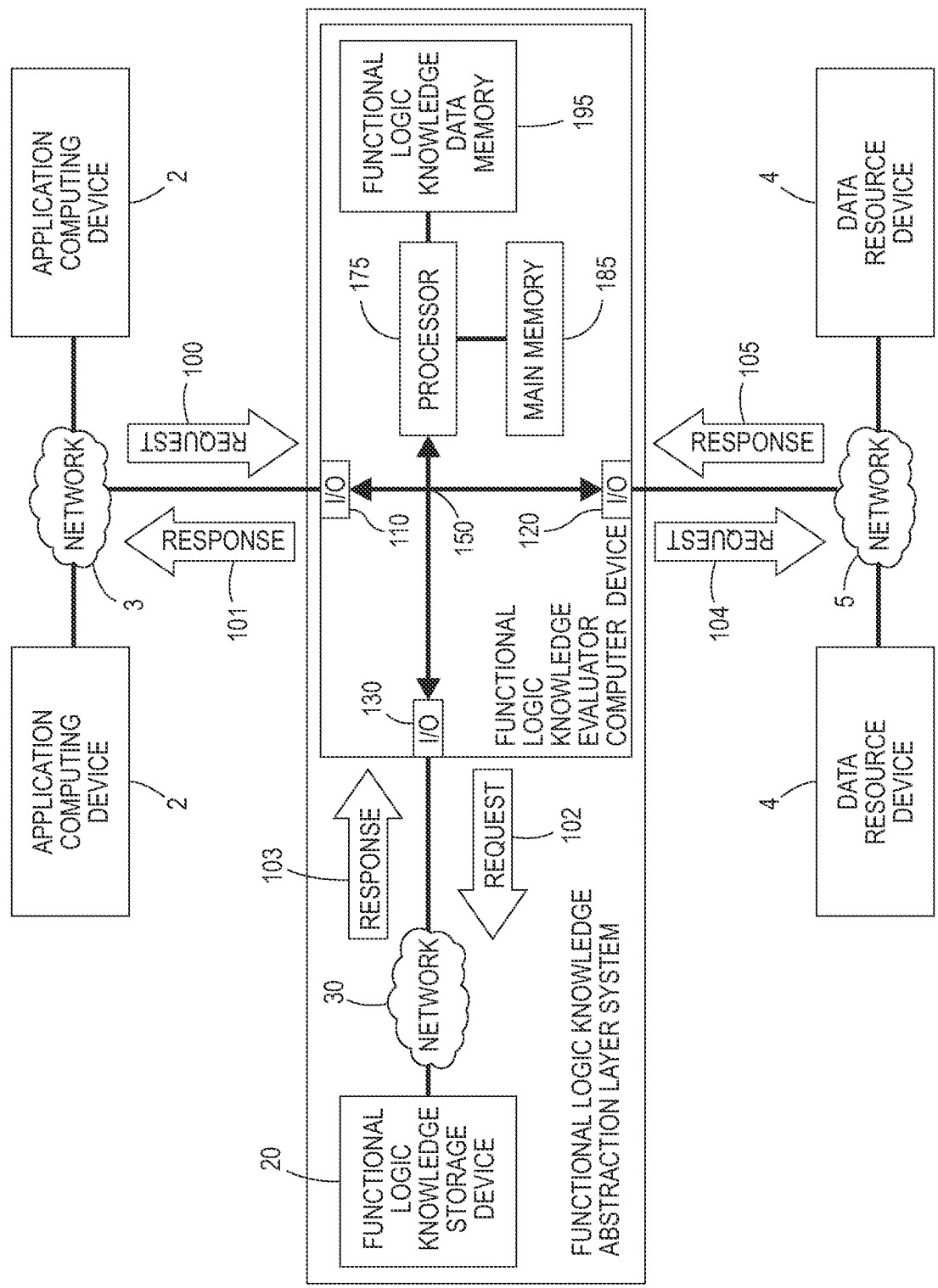
FIG. 1 is a block diagram of a functional logic knowledge abstraction layer system according to an exemplary embodiment of this disclosure.

This disclosure provides a method and system for curating both observation and logical knowledge while using traditional data storage technologies. This is accomplished by storing compiled Boolean information representing the data as factual knowledge and the logic for interpreting that data. Combining this functional logic knowledge repository with a logic evaluation system creates a knowledge abstraction layer that simplifies the design, maintenance and reuse of the curated knowledge. In addition, a "hierarchical taxonomy naming convention" described herein provides "meaning by classification" and exposes the interrelationships among the various instances. The disclosed method and system not only ties the "significance of the information" to the data, but articulates a way to manage and extract it.

This disclosure, and the exemplary embodiments provided herein, enables curating both factual knowledge, stored in its "compiled" Boolean form that is immediately usable by Boolean logic, and logical knowledge which uses that factual knowledge to arrive at an outcome within a common data storage technology architecture. Specifically, a knowledge repository is included that includes: a data structure placed within a data storage system that then becomes a storehouse for "functional logic knowledge" (FLK). The knowledge repository is used to enable a "knowledge abstraction layer" for a computer system(s).

The curation of both factual knowledge and logical knowledge is provided, according to an exemplary embodiment of this disclosure, because the identity of entities, the significance of data related to those entities and the logic needed for evaluation are all represented as Boolean combinational logic functions that then represent the justifiable knowledge of a domain. Stored instances of functional logic knowledge are each individually named following a "hierarchical taxonomy naming convention" that provides meaning by classification. The disclosed knowledge base also records relationship knowledge between FLK instances. The disclosed repository of FLK instances and their interrelationships, along with the hierarchical taxonomy naming convention for those FLK instances, allows a system to store complete knowledge of any entity within a given domain in a way that allows other systems to retrieve and evaluate knowledge about it and thus answer questions regarding the domain.

According to an exemplary embodiment, the FLK knowledge base can be a part of the computer system that serves to abstract functional logic knowledge out of other system components. One application includes the use of the FLK knowledge base to store customer-related information significance regarding a customer's rights to specific aspects of applications using the stored knowledge about the customer, the customer's business processes and the requirements of the applications.

While the description provided herein focuses on an application of the FLK knowledge base in the context of providing an entitlement query using a knowledge base system to determine entitlement of a machine to the use of remote technical services, the disclosed knowledge abstraction layer can be used/contained inside any computer system where complex logic knowledge is processed. The ability of the FLK knowledge base to hold all domain knowledge enables the consolidation of fragmented, disjointed and frequently redundant data and logic knowledge from within various other subsystems of multi-tiered applications into a single, robust, distributed and independent repository. Combining the FLK knowledge base with a logic evaluation system creates a knowledge abstraction layer, thus simplifying the design of programs that need the knowledge as well as the maintenance and reuse of that knowledge throughout an enterprise.

The FLK knowledge base system and method include a process for using common data storage technology to store both declarative functional knowledge and codified imperative knowledge where knowledge equates to the necessary and sufficient conditions for justified belief, thus creating a functional logic knowledge (FLK) repository. Combining this FLK repository with a logic evaluation system creates a knowledge abstraction layer. In addition, disclosed here is a method for designing and inputting that knowledge representation, i.e., curating it in a datastore.

The implementation described herein uses a distributed, replicated and load-balanced LDAP system based on the same technology as Microsoft's Active Directory® as its data storage technology, but other data storage technologies, such as an RDBMS can be used.

The disclosed FLK knowledge base and associated system provide a way to use many common data storage technologies to fulfill an unmet need, namely the need for a repository that represents "functional logic knowledge" in a single, homogenous system as domain entity identities and information about those entities, knowledge of the significance of the information that is known about those entities, and the logical knowledge of how to evaluate it all.

Structurally, entity "identity" and "information significance" are stored in a repository, i.e., knowledge base, as a representation of functional logic knowledge rather than data, as is typically done using common data storage technology. The knowledge base specifies a repository for instances of three fundamental types of functional logic knowledge, i.e., FLK instances, sometimes referred to as functions herein.

FLK instances are defined as "subject", "observation" and "gate" FLK types where, instances of "subject" FLK types identify an entity;

instances of "observation" FLK types codify a procedure used to detect a truth; and instances of "gate" FLK types apply specific Boolean logic and serve to relate other FLK instances, including subject instances, observation instances and gate instances.

According to an exemplary embodiment, FLK instances are individually named following a "hierarchical taxonomy naming convention" to provide "meaning by classification". That is, each "branch" of the hierarchy inherits a general meaning from its predecessor branches and creates a more specific meaning with its own name. The formal name of an FLK instance is its entire taxonomical name, i.e., its branch of the hierarchy, from the most general to the most specific followed by that FLK instance's "common name". The classification, and thus the meaning of the FLK, is therefore based on the branch of the hierarchy into which it is created and by which it is named.

Placed in the repository is the relationship knowledge between FLK instances and the specific "gate" FLK instances to which they are related, which frequently represents information that is significant to an entity. The FLK instances that are related to the gate FLK instance are evaluated by a logic evaluator during that gate FLK instance's evaluation and are therefore "factors" in the gate FLK instance's evaluation outcome. FLK instances thus related are said to be in the role of a "factor" to that gate FLK instance. This relationship between FLK instances is called a "filiation".

The repository of FLK instances and their filiations, along with the hierarchical taxonomy naming convention for those FLK instances, allows the FLK repository system to store complete knowledge of an entity in a way that allows other systems to retrieve and evaluate knowledge about the entity and thus provide answers to questions regarding the entity.

FIG. 1 illustrates a functional logic knowledge abstraction layer system according to an exemplary embodiment. As illustrated by FIG. 1, the functional logic knowledge abstraction layer system 1 may include a functional logic knowledge evaluator computer device 10, a functional logic knowledge storage device 20 and a network system 30 (which may connect the two devices 10 and 20).

As illustrated by FIG. 1, the exemplary functional logic knowledge evaluator computer device 10 includes a main memory component 185 holding functional logic knowledge processing instructions, a functional logic knowledge data memory component 195 holding functional logic knowledge as observation, subject and gate objects, a plurality of input/output (I/O) components 110, 120, 130 interfacing to other systems, a processor component 175 which uses the functional logic knowledge processing instructions to evaluate the functional logic knowledge observation, subject and gate objects and an internal system bus component 150 interconnecting the I/O components 110, 120, 130 to the processor component 175.

As illustrated by FIG. 1, the exemplary functional logic knowledge abstraction layer system 1 may be connected to a plurality of application computing devices 2 needing answers to questions in order to perform their tasks and may be connected to a plurality of data resource devices 4 providing the data needed to answers questions. The application computing device 2 sends a request 100 over a network 3 to an I/O component 110 of a functional logic knowledge evaluator computer device 10 of a functional logic knowledge abstraction layer system 1. The I/O component 110 of the functional logic knowledge evaluator computer device 10 forwards that request 100 over an internal system bus component 150 to the processor component 175 of that functional logic knowledge evaluator computer device 10 where a plurality of functional logic knowledge processing instructions stored within the main memory component 185 are used to interpret the request and infer a response 101 based on the functional logic knowledge observation, subject and gate objects within the functional logic knowledge data memory component 195. The processor component 175 sends the completed response 101 to an I/O component 110 over an internal system bus component 150. The I/O component 110 may further forward that response 101 over a network 3 to an application computing device 2 that originated the initial request 100.

According to the exemplary embodiment, if, during the execution of the functional logic knowledge processing instructions, the processing component 175 determines that the needed functional logic knowledge observation, subject or gate objects are not found in the functional logic knowledge data memory 195 then the functional logic knowledge processing instructions stored within the main memory component 185 will direct the processor component 175 to use an internal system bus component 150 to send a request 102 via an I/O component 130 over a network 30 to a functional logic knowledge storage device 20. According to an exemplary embodiment, a functional logic knowledge storage device would produce a response 103 containing the needed functional logic knowledge observation, subject and gate objects and send the response 103 over a network 30 to an I/O component 130 in a functional logic knowledge evaluator computer device. An I/O component 130 of the functional logic knowledge evaluator computer device 10 may further forward that response 103 to the processor component 175 of that functional logic knowledge evaluator computing device 10 where a plurality of functional logic knowledge processing instructions stored within the main memory component 185 would be used to place the contents of the response 103 into the functional logic knowledge data memory component 195 as the needed functional logic knowledge observation, subject and gate objects.

According to the exemplary embodiment, if, during the evaluation of a functional logic knowledge observation object by the plurality of functional logic knowledge processing instructions in the processor component 175, additional data is needed to answer questions, then the functional logic knowledge processing instructions stored within the main memory component 185 directs the processor component 175 to use an internal system bus component 150 to send a request 104 via an I/O component 120 over a network 5 to a data resource device 4. The data resource device produces a response 105 containing the needed additional data and send the response 105 over a network 5 to a I/O component 120 in a functional logic knowledge evaluator computer device. The I/O component 120 of the functional logic knowledge evaluator computer device 10 may further forward that response 105 to the processor component 175 of that functional logic knowledge evaluator computing device 10 where a plurality of functional logic knowledge processing instructions stored within the main memory component 185 would be used to interpret the contents of the response 105 as the needed additional data and continue the evaluation of the functional logic knowledge observation object.

Figure 2:
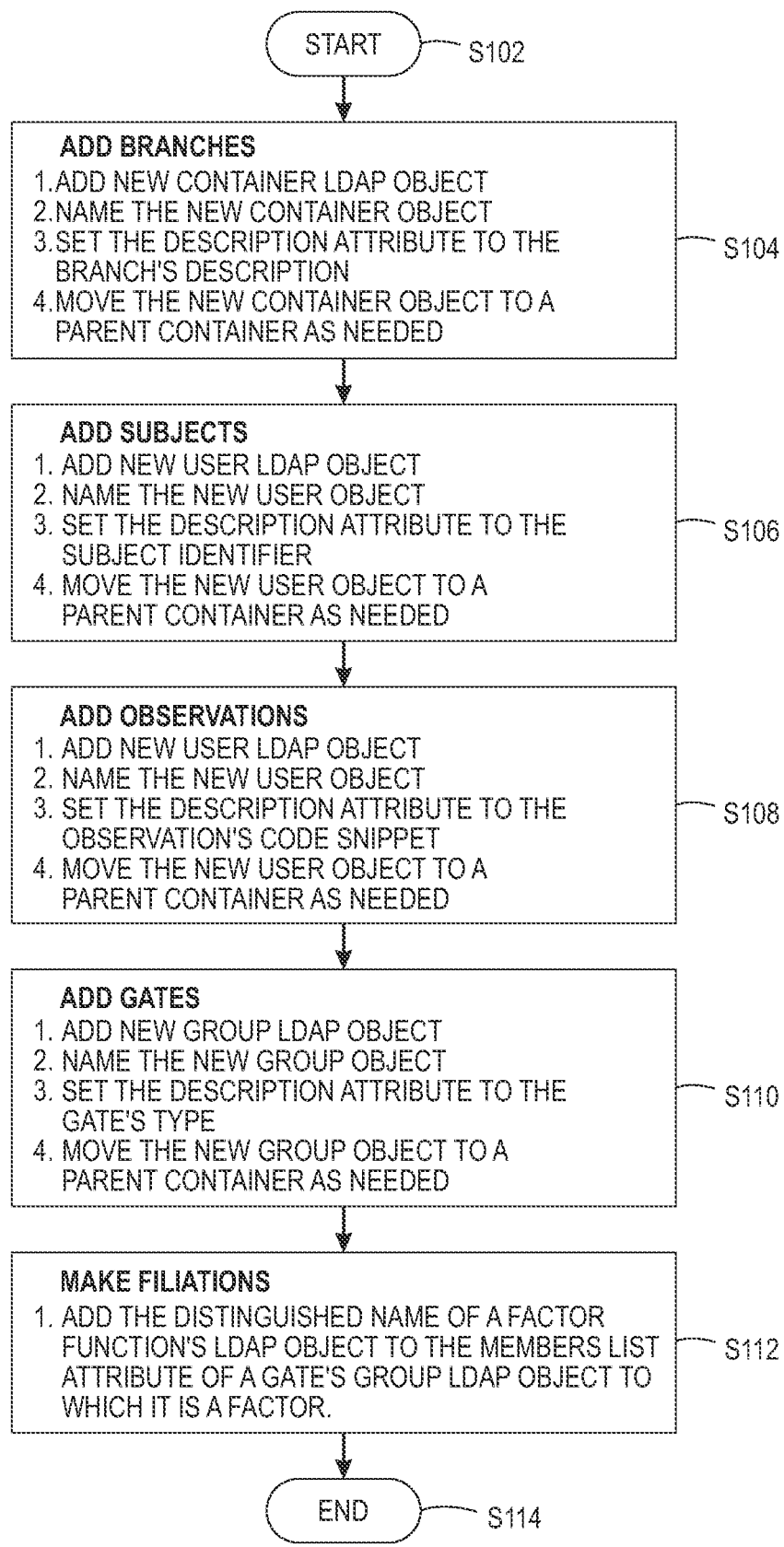
FIG. 2 is a flow chart of a method for generating a Functional Logic Knowledge base according to an exemplary embodiment of this disclosure.

With reference to FIG. 2, illustrated is a flow chart of a method for generating a knowledge base according to an exemplary embodiment of this disclosure.

At S102, the method begins.

At S104, the methods Adds Branches, including the following steps:

1. Add New Container LDAP object.
2. Name the new Container object.
3. Set the Description attribute to the Branch's description.
4. Move the new Container object to a parent container as needed.

At S106, the method Adds Subjects, including the following steps:

1. Add new User LDAP object.
2. Name the new User object.
3. Set the Description attribute to the Subject's identifier.
4. Move the new User object to a parent container as needed.

At S108, the method Adds Observations, including the following steps:
1. Add new User LDAP object.
2. Name the new User object.
3. Set the Description attribute to the Observation's code snippet.
4. Move the new User object to a parent container as needed.

At step 110, the method Adds Gates, including the following steps:
1. Add new Group LDAP object.
2. Name the new Group object.
3. Set the Description attribute to the Gate's type.
4. Move the new Group object to a parent container as needed.

At step 112, the method Adds Filiations, including the following step:
1. Add the Distinguished Name of a Factor Function's LDAP object to the Members list attribute of a Gate's group LDAP object to which it is a factor.

At step 114, the method ends.

Figure 3:
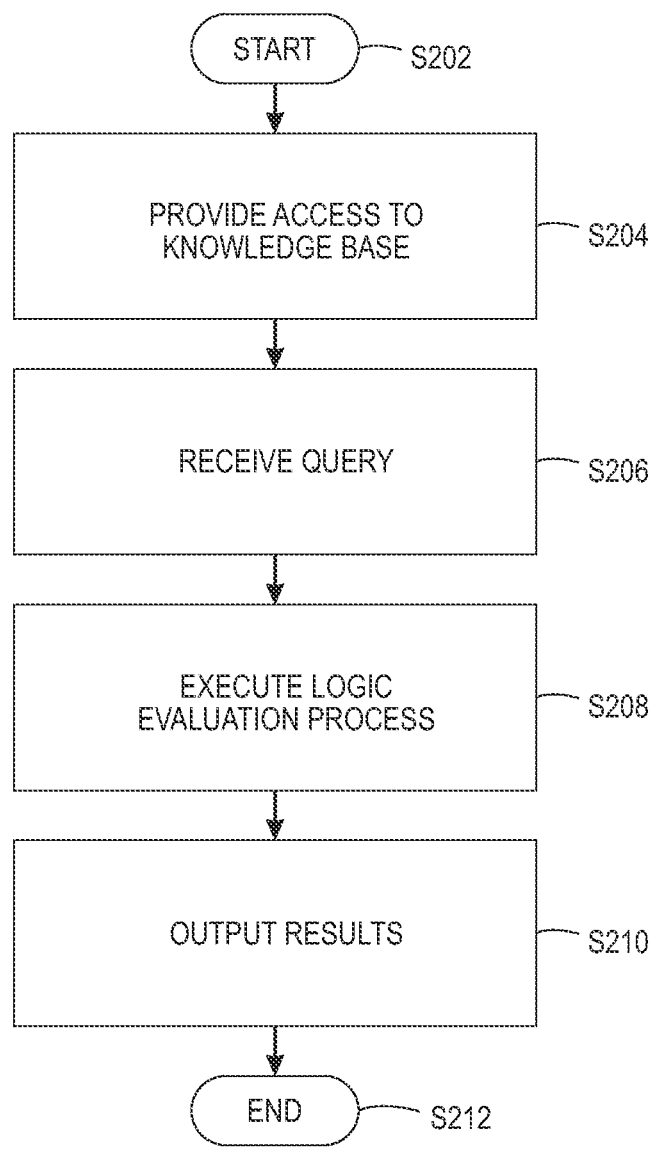
FIG. 3 is a flow chart of a method for querying and evaluating a Functional Logic Knowledge base according to an exemplary embodiment of this disclosure.

With reference to FIG. 3, illustrated is a flow chart of a method for querying and evaluating a knowledge base according to an exemplary embodiment of this disclosure.

At S202, the method begins.
At S204, the method provides access to knowledge base.
At S206, the method receives a query.
At S208, the method executes Logic Evaluation Process.
At S210, the method outputs the query results.
At S212, the method ends.

Exemplary Examples

With reference to FIG. 4, shown is an example of a Hierarchical Taxonomy Naming Convention according to this disclosure.

In this example, 22 different branches have been define, the branches defined as RTS, Location, Exclusion, Rules, Rules, Facilities, Availability, Rules, Machine, Location, Human_Resources, Policy, Corporate, Service_Hours, Admin, Billing, Do_Not_Service, Product, Discontinued, Context, Facts, and Calendar.

For example, the formal name of an FLK instance with a common name of "Machine_Is_RTS_Eligible" that is created within the "Rules" branch of the "RTS" branch would be expressed as "RTS.Rules:Machine_Is_RTS_Eligible" where the ":" is a delimiter between the branch name and the FLK instance's common name. That particular FLK instance is labeled "A10", below.

Figure 5:
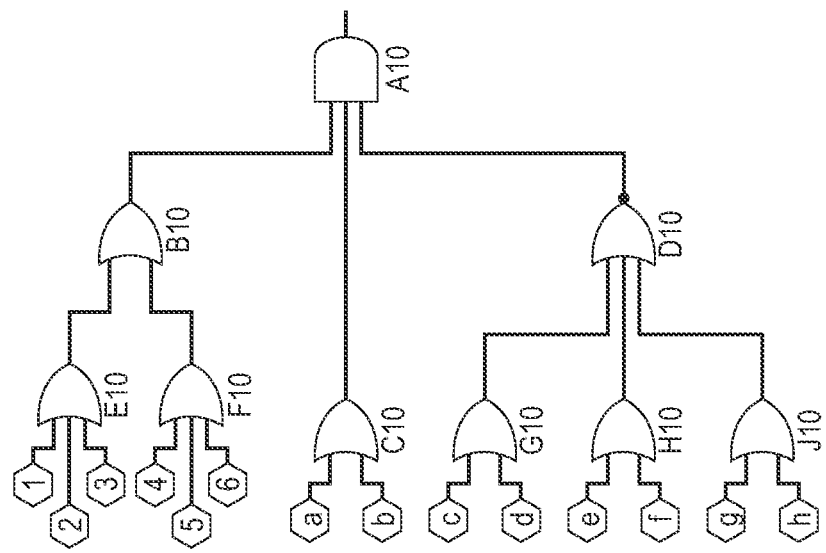
FIG. 5 is an example of a knowledge base configuration according to an exemplary embodiment of this disclosure.

With reference to FIG. 5, shown is an example of several FLK instances and their filiations The filiation schematic diagram, and labels from the table, indicates the following:

gate FLK instance "A10" has gate FLK instances "B10", "C10" and "D10" as factors;
gate FLK instance "B10" has gate FLK instances "E10" and "F10" as factors;
gate FLK instance "E10" has subject FLK instances "1", "2" and "3" as factors;
gate FLK instance "F10" has subject FLK instances "4", "5" and "6" as factors;
gate FLK instance "C10" has observation FLK instances "a" and "b" as factors;
gate FLK instance "G10" has observation FLK instances "c" and "d" as factors;
gate FLK instance "H10" has observation FLK instances "e" and "f" as factors; and
gate FLK instance "J 10" has observation FLK instances "g" and "h" as factors.

Gate FLK instance "A10" has a logic evaluation mode "AND", gate FLK instances "B10", "C10", "E10", "F10", "G10", "H10" and "J10" all have logic evaluation modes of "OR". Gate FLK instance "D10" has a logic evaluation mode "NOR".

This example can be evaluated to indicate that:
"if the subject is Machine:1 through Machine:6, and either
Today_Is_Weekday or Today_Is_Special_Day, but neither
Today_Is_Christmas nor Today_Is_Thanksgiving nor
After_Work_Hours nor Before_Work_Hours nor
Latest_Do_Not_Service_List nor Latest_Discontinued_List are true THEN the subject Machine_Is_RTS_Eligible."

FLK "filiations" are an important part of the knowledge. The diagram of FIG. 5 illustrates the 3 components in any "filiation": A gate function (in this example, F10) [Reminder: only gates can have factors], another function of any FLK type (in this example, 6) and a relationship between these 2 functions that establishes "FLK 6" as a "factor" in the outcome of "FLK F10". This relationship asserts that FLK 6 has FLK F10 as a "feature". A "feature" is another name for a "significance". So, rather that storing a value that must be interpreted along with how to interpret it (e.g. Country="US"), we instead remember that "Machine:6" has "Machine.Location:USA" as a feature.

Assimilation is the process where a knowledge system acquires new knowledge. According to this disclosure, some FLK "X" establishes a filiation to some Gate FLK "Y" that represents a feature of, or significance to, that particular FLK "X".

For an LDAP implementation, that filiation is established within the Gate FLK "Y" by adding the factor FLK "X" to its "member" list. In an RDBMS implementation, it would be established by creating a record in a table that associates the Gate FLK "Y" with the factor FLK "X".

Note: the *meaning* of the filiation is established by gate FLK, not by the factor FLK. In the example above, FLK 6 is a factor in the outcome of FLK 10; FLK 10 is not a factor of FLK 6. Since the meaning of F10 is "the machine is located in the USA" we infer that "the entity represented by FLK 6 is located in the USA".

Implementation Examples

According to an exemplary embodiment, a hierarchical taxonomy naming system is implemented using LDAP "container" objects, nested one within the other, one for each "branch" of the hierarchical taxonomy, as needed to establish the meaning to be attributed to the contents of those containers.

All FLK instances are implemented as either LDAP "group" or "user" objects. Group objects represent "gate" FLK types while user objects represent both "observation" and "subject" FLK types.

All FLK instances are created within the desired LDAP container that establishes the desired meaning per the hierarchical taxonomy.

All FLK instance filiations are implemented as "LDAP group memberships" in the gate FLK type LDAP group objects. Gate, Observation and Subject FLK instances establish a filiation with a gate FLK instance when they become a factor in the evaluation of the gate FLK instance. For this implementation, an FLK instance becomes a factor of a gate FLK instance by gaining LDAP group membership in that gate FLK instance's LDAP group object.

Each FLK instance's representative LDAP object's "description field" stores specific descriptive information, based on the FLK type. In a gate FLK instance, the LDAP object's "description field" stores the "logic evaluation mode" of that gate FLK instance. There are 6 different gate FLK "logic evaluation modes" that are used to accomplish the gate FLK evaluations: i.e. the Boolean algebra operations of "AND", "OR", "XOR", "NAND", "NOR" and "XNOR". In an observation FLK instance, the LDAP object's "description field" stores the codified procedure text. In a subject FLK instance, the LDAP object's "description field" stores the subject's description.

Other data storage technologies might store these FLK instances differently, e.g. represented as fields in tables or as objects in memory. According to another exemplary embodiment, a RDBMS implementation is described below.

A hierarchical taxonomy naming system is implemented using rows in a Branches table, one row for each branch. Columns of that table include a unique identifying number column, a CommonName column, and a column for a number that represents a pointer to the parent branch's unique identifying number, with a null representing a root branch of the hierarchy.

All FLK instances are rows in an FLKInstances table. Columns of that table include a unique identifying number column, a CommonName column, a column with a number that represents a pointer to the FLK branch's unique identifying number, null is not allowed here, an FLKType column representing gate, observation or subject FLK types, and a description column holding a description appropriate for the type of FLK represented by this row in the table.

All FLK instances are created with a Branch pointer value representing the branch that establishes the desired meaning per the hierarchical taxonomy.

All FLK instance filiations are implemented as rows in an FLKRelationships table. The table is an intersection table, representing a many-to-many relationship, with a column for a number that represents a pointer to the gate FLK instance and a column with a number that represents a pointer to the FLK instance that is a factor to the gate FLK instance. For this implementation, an FLK instance becomes a factor of a gate FLK instance by adding a row to the FLKRelationships table using the gate FLK instance's unique identifying number and the factor FLK instance's unique identifying number.

Each FLK instance's representative row in the FLKInstances table's "description column" stores specific descriptive information, based on the FLK type.

For a gate FLK instance, the row in the FLKInstances table's "description column" stores the "logic evaluation mode" of that gate FLK instance. There are 6 different gate FLK "logic evaluation modes" that are used to accomplish the gate FLK evaluations: i.e. the Boolean algebra operations of "AND", "OR", "XOR", "NAND", "NOR" and "XNOR".

For the observation FLK instance, the row in the FLKInstances table's "description column" stores the codified procedure text.

For the subject FLK instance, the row in the FLKInstances table's "description column" stores the subject's description.

According to an exemplary embodiment, a separate system queries and retrieves FLK instances with their type, description and filiations by the FLK instance's formal name. The separate system also implements a recursive evaluation process that permits a FLK instance to perform both forward chaining reasoning and backward chaining reasoning over the knowledge.

Described now is an example of how a question's Knowledge is stored within a LDAP repository and subsequently evaluated according to a backward chaining evaluation process, according to an exemplary embodiment of this disclosure.

Storing the knowledge "RTS.Rules:Machine_Is_RTS_Eligible" as it relates to "Machine:3"

Machine_Is_RTS_Eligible is the name of an AND Gate Function. We create the gate by creating a LDAP Group Object named "Machine_Is_RTS_Eligible" that represents that gate function.

LDAP Group Objects must be created within LDAP Container Objects. The LDAP Container Object that the group will be created in is the "Rules" LDAP Container Object. LDAP Container Objects are likewise created within other LDAP Container Objects and the "Rules" LDAP Container Object will be created in the "RTS" LDAP Container Object. LDAP Container Objects represent branches of the hierarchical taxonomy naming convention.

The result is that the LDAP Container Object named "RTS" will contain another LDAP Container Object named "Rules" which will, in turn, contain a LDAP Group Object named "Machine_Is_RTS_Eligible". According to the disclosed convention, the distinguished name for that group object is "RTS.Rules:Machine_Is_RTS_Eligible". The Hierarchical Taxonomy thus established represents a "meaning" of the function: i.e., it is a rule in RTS that determines if a machine entity is eligible. The taxonomy is not a part of the inferencing process, it only establishes the meaning of the functions.

It was previously mentioned that RTS.Rules:Machine_Is_RTS_Eligible is an "AND Gate Function". This is represented by placing the word "AND" into the "description" LDAP Attribute of that LDAP Group Object. It is interpreted to be a "Gate Function" because it is a LDAP Group Object. It is interpreted it to be an "AND" gate type because of the "AND" word in the description attribute.

Gate Functions have zero (0) or more "factor" functions that are themselves evaluated for their true or false outcomes. The outcomes of these factors are evaluated according to the Boolean algebraic method that have been assigned to the gate function, in this case "AND".

To represent that another function is a factor in the evaluation of a gate function, place the distinguished name of that other function into the "members" LDAP attribute of the LDAP Group Object representing the gate function. The members attribute maintains a list of references to other LDAP objects. The presence of the distinguished name of a LDAP object in the members attribute of a LDAP group objects represents that the gate function has the other function as a factor in its evaluation.

The AND gate function RTS.Rules:Machine_Is_RTS_Eligible has multiple factors. Each are added in a manner similar to the about process. There is no specific limit as to how many gate functions can be related as factors, either in the members attribute of the LDAP group object or in the depth of recursively nested other LDAP group objects that represent nested gate functions.

Machine:3 is not a gate function. It is a Subject function and represents an entity in the real or virtual world. It is created by creating a LDAP User Object named "3" in a LDAP Container Object (created earlier) named "Machine". The LDAP description attribute of the LDAP User Object named "3" is an identifier for this entity, in this case, a machine serial number "3". Thus, a subject function will be a factor to (and will have its distinguished name in the members attribute of) every function that is said to be true about that subject.

Observation functions are small procedural code snippets that are executed to provide external current knowledge. They are constructed in LDAP in a fashion similar to Subject functions but the description attribute contains their code snippet to be executed during its evaluation.

The above processes are repeated for all of the logic knowledge functions to complete the knowledge repository within the LDAP service. When completed, the Subject function "Machine:3" in the example is a factor in the evaluation of the Gate function "Machine.Location:Canada" which is in turn a factor in the evaluation of the Gate function "RTS.Location:North_America" which is finally a factor in the evaluation of the Gate function (above) "RTS.Rules:Machine_Is_RTS_Eligible". These factor-to-function relationships are stored in the LDAP repository as described above: the distinguished name of a function is placed into the members attribute of a gate function, nested as needed.

Evaluating "RTS.Rules:Machine_Is_RTS_Eligible" regarding "Machine:3"—A Description of the "Backward Chaining" Evaluation Process In pseudo-code (This code is not meant to show any possible optimizations. Rather, it is meant only to illustrate how the LDAP Objects retrieved from the repository might represent functional logic knowledge and how that facilitates the evaluation of that knowledge in support of backward chained reasoning):

All assimilation (acquiring new knowledge) and accommodation (updating existing knowledge) occurs by the use of web methods on the Evaluator subsystem. The logic for learning from the information provided by the assimilator is processed by the Evaluator.

Sources of record may have information "pushed" to a web service endpoint on the Assimilator subsystem where the interface to the Evaluator is defined. Information received will be provided to the Evaluator as a part of the web method call.

Sources of record may also have information "pulled" from them by scheduled tasks that perform simple low-level ETL-type tasks against the data sources. These scheduled tasks then call the above "push" Assimilator endpoint web methods to allow the Evaluator to acquire the new or updated knowledge.

Assimilation may also happen directly and "just-in-time" by the Evaluator itself through its use of Observation function side effects.

These web services and scheduled tasks may reside on any appropriate server and are not required to reside on the same server as the Evaluator subsystem or the Library subsystem.

Notably, the specifics of the "push" endpoints and "pull" scheduled tasks are defined as the specific sources of record are identified and the logic schema for their assimilation are designed.

```
Procedure Main
        Return    Question_Outcome(RTS.Rules:Machine_Is_RTS_Eligible,
Machine:3)
End Main
Procedure Question_Outcome(Question_Gate,Scope_Subject)
        Call    Evaluate(Retreive_From_LDAP(Question_Gate),    Scope_Subject)
End Question_Outcome
Procedure Evaluate (Current_Function, Scope)
        If Type_Of(Current_Function) is Subject then
                If Current_Function.DistinguishedName is Scope then
                        Return TRUE
                Else
                        Return FALSE
                End if
        Elseif Type_Of(Current_Function) is Observation then
                        Return ExecuteCode(Current_Function)
        Else
                For    each    Factor_Function    in
Current_Function.Factors_List
                        Accumulated_Factor_Outcomes.Append
Evaluate(Retreive_From_LDAP(Factor_Function),Scope)
                Next Factor_Function
                Return
Applied_Boolean_Algebraic_Logic(Current_Function.GateType,
Accumulated_Factor_Outcomes)
        End if
End Evaluate
```

Described below is an exemplary embodiment of one implementation of a knowledge base system including a functional logic knowledge (FLK) repository as described an disclosed herein, the exemplary knowledge base system includes an Assimilator Subsystem, a Designer Subsystem, and an Evaluator Subsystem. The following description also describes a language which can be used to record and evaluate logic problems described by Subject Matter Experts.

Assimilator Subsystem

An Assimilator subsystem is a compound system, part web services and part scheduled tasks. It does not import data into a Library subsystem. It does, however, collect data and information from sources of record regarding entities and their features, forwarding it on to an Evaluator subsystem.

Designer Subsystem

The Designer subsystem is a web application used by Subject Matter Experts (SMEs) to craft logic schema. C#, .Net, integrate a small "Processing.js" JavaScript program for the schematic diagram interface.

A function must exist before it can be evaluated so a language for designing functions is provided herein. Existing symbolic languages for logic functions have a very steep learning curve, require complicated parsing and interpretation, and aren't easily managed when the number of details becomes large. A language is provided here that defines a graphical and simple logic language inherited from the digital logic design world of logic schematics.

Interpreted as functions and diagramed as logic "gates", this language allows an SME to capture all of their knowledge about a subject into a form that can be directly evaluated by a machine (because the Library curates the knowledge as directly accessible LDAP objects) and easily understood by a human (due to the interactive and graphical nature of the schematic diagram in the Designer subsystem).

Evaluator Subsystem

Described now is a web service that responds to requests from consumers. Using an FLK repository, the web service is called an Evaluator and hosts multiple methods needed to provide functionality.

Web Methods

The web methods are grouped into several basic categories:
1. Evaluate
2. Enumerate
3. Create
4. Modify
5. Error Handling Evaluate The first evaluate web method is BackwardChainEvaluate.

BackwardChainEvaluate has four input parameters and returns an XML representation of two lists of "Distinguished Name=outcome" (name=value) pairs, specifically:

1. The Assert List: A sequential list of all of the functions (and outcomes) whose outcome allowed the evaluation to continue. It can be empty if the first evaluation prevented further evaluations.

2. The Deny List: A sequential list of all of the functions (and outcomes) whose outcome caused the evaluation to end. It can be empty if evaluation continued until there were no more functions to evaluate.

The input parameters are 1) the Distinguished Name of the Scope Factor function; 2) the Distinguished Name of the Goal Function; 3) the Context, a text string representing the context to be considered by any observation functions during evaluation and 4) the Assumptions, an ampersand-delimited list of "name=value" pairs where each pair is the Distinguished Name of a function and its assumed Boolean value.

BackwardChainEvaluate will call the "BackwardChainEvaluate" method on the Goal Functions, passing in the Context, Assumptions and Scope Factor parameters.

BackwardChainEvaluate is recursive and will continue until there are no more functions to evaluate or until there are no more evaluations needed to determine the outcome. During Backward Chain Evaluation, the Scope Factor Function is assumed to be true and won't be evaluated. Assumptions are assumed to have their stated outcome (can be either true or false) and won't be evaluated.

The second evaluate web method is ForwardChainEvaluate.

ForwardChainEvaluate has four input parameters and returns an XML representation of the Distinguished Names and the outcomes of all of the other functions whose outcome allowed the evaluation to continue.

The input parameters are 1) the Distinguished Name of the Scope Factor function; 2) the Distinguished Name of the Goal Family; 3) the Context (as above) and 4) the Assumptions (also as above).

ForwardChainEvaluate will call the "ForwardChainEvaluate" method on the Scope Factor functions, passing in the Context and Assumptions parameters. During Forward Chain Evaluation, the Scope Factor Function represents the starting point, is not assumed to be true and is evaluated. Assumptions are assumed to have their stated outcome (can be either true or false) and won't be evaluated.

ForwardChainEvaluate is recursive and will continue its evaluation until there are no more functions to evaluate or until a function evaluates to true that is an immediate member of the Goal Family.

Enumerate

The first enumerate method is ListSiblings.

ListSiblings has one input parameter and returns an XML representation of the Distinguished Names of all of the families or functions that are within the family as the input parameter. The input parameter is the Distinguished Name of either a family or a function.

ListSiblings will iterate over the Members collection of the input parameter's family while assembling the XML results string.

Implementation: This is a "Container List" method. The passed in parameter is a distinguished name for EITHER a family or a function. In either case, this is a listing of the members of the FAMILY that CONTAINS the object that is identified by the passed in parameter. Therefore, that containing object must first be identified. It is immediately identified by discarding the last name portion of the passed in distinguished name, regardless of whether it is a family or a function name. Since this is a listing of a family, and families can contain both functions and other families, if the passed in parameter is a function then list only functions (gates, observations or subjects). But, if the passed in parameter is a family then list only families.

The second enumerate method is ListFactors.

ListFactors has one input parameter and returns an XML representation of the Distinguished Names of all of the functions that are factors to the input parameter. The input parameter is the Distinguished Name of a gate function.

ListFactors will iterate over the Members collection of the input parameter gate function while assembling the XML results string.

The third enumerate method is ListFiliations.

ListFiliations has one input parameter and returns an XML representation of the Distinguished Names of all of the functions that are either a factor of the input parameter or that the input parameter is a factor of. The input parameter is the Distinguished Name of a function.

ListFiliations will iterate over the Members collection (if the input parameter is a gate function) and IsMemberOf collection of the input parameter function while assembling the XML results string.

Implementation: This method combines ListFactors and ListFactorOf into a single method. Its XML results must contain two structures, "Factors" and "FactorOf", to indicate if the filiation is from the ListFactors or ListFactorsOf.

The fourth enumerate method is ListFactorOf.

ListFactorOf has one input parameter and returns an XML representation of the Distinguished Names of all of the functions that the input parameter is a factor of. The input parameter is the Distinguished Name of a function.

ListFactorOf will iterate over the IsMemberOf collection of the input parameter function while assembling the XML results string.

Create

The first create method is NewFamily.

NewFamily has two input parameters and returns the Distinguished Name of the newly created family. The input parameters are 1) the Distinguished Name of the family into which the family is to be created and 2) the Common Name of the new family. The Common Name must be unique within the family and are not case sensitive.

The second create method is NewSubjectFunction.

NewSubjectFunction has two input parameters and returns the Distinguished Name of the newly created function. The input parameters are 1) the Distinguished Name of the family into which the function is to be created and 2) the Common Name of the new function. The Common Name must be unique within the family and are not case sensitive.

The third create method is NewObservationFunction.

NewObservationFunction has three input parameters and returns the Distinguished Name of the newly created function. The input parameters are 1) the Distinguished Name of the family into which the function is to be created; 2) the Common Name of the new function and 3) the C# code value for the new function. The Common Name must be unique within the family and are not case sensitive.

The fourth create method is NewGateFunction.

NewGateFunction has three input parameters and returns the Distinguished Name of the newly created function. The input parameters are 1) the Distinguished Name of the family into which the function is to be created; 2) the Common Name of the new function and 3) the evaluation mode enumerator for the desired Boolean Evaluation Mode (i.e.: 0=AND, 1=OR, 3=XOR, 4=NAND, 5=NOR and 6=XNOR). The Common Name must be unique within the family and are not case sensitive.

Modify

The first modify method is RenameFamily.

RenameFamily has two input parameters and returns the Distinguished Name of the renamed family. The input parameters are 1) the Distinguished Name of the family to be renamed and 2) the new Common Name of the family. The Common Name must be unique within the family and are not case sensitive.

The second modify method is RenameFunction.

RenameFunction has two input parameters and returns the Distinguished Name of the renamed function. The input parameters are 1) the Distinguished Name of the function to be renamed and 2) the new Common Name of the function. The Common Name must be unique within the family and are not case sensitive.

The third modify method is MoveFamily.

MoveFamily has two input parameters and returns the Distinguished Name of the moved family. The input parameters are 1) the Distinguished Name of the family to be moved and 2) the Distinguished Name of the family to move to.

The fourth modify method is MoveFunction.

MoveFunction has two input parameters and returns the Distinguished Name of the moved function. The input parameters are 1) the Distinguished Name of the function to be moved and 2) the Distinguished Name of the family to move to.

The fifth modify method is UpdateSubject.

UpdateSubject has two input parameters and returns the Distinguished Name of the updated function. The input parameters are 1) the Distinguished Name of the subject function to update and 2) the Description value for the updated function.

The sixth modify method is UpdateObservation.

UpdateObservation has two input parameters and returns the Distinguished Name of the updated function. The input parameters are 1) the Distinguished Name of the observation function to update and 2) the C# code value for the updated function.

The seventh modify method is UpdateGate.

UpdateGate has two input parameters and returns the Distinguished Name of the updated function. The input parameters are 1) the Distinguished Name of the observation function to update and 2) the evaluation mode enumerator for the desired Boolean Evaluation Mode (i.e.: 0=AND, 1=OR, 3=XOR, 4=NAND, 5=NOR and 6=XNOR) for the updated function.

The eight modify method is SetFiliation.

SetFiliation has three input parameters and returns a Boolean value indicating the now current state of the filiation, "True" meaning that the filiation as defined now exists or "False" meaning that the filiation does not now exist. The input parameters are 1) the Distinguished Name of the factor function; 2) the Distinguished Name of the function that has or will have the factor and 3) a Boolean value where "True" means that the filiation should exist (create the filiation if it does not exist) and "False" means that the filiation should not exist (remove the filiation if it does exist).

5F is a Knowledge Representation and Management Language. Systems that implement 5F are capable of recording and evaluating logic problems described by Subject Matter Experts (independent of domain) as well as the significance of any of the related data items of that domain. 5F systems are capable of inferring new knowledge and using it in their logical evaluations. The 5F language supports reaching out to other data or knowledge systems, both for new knowledge and to affect change in those systems.

Described below are foundational concepts used in the 5F language and systems that implement that language. When fully understood by the SME, the SME should be able to use those concepts to imbue a 5F system with their own subject matter expertise and then have that system use the embed expertise to quickly, accurately and repeatedly provide the same answers that the SME would have provided.

Simply stated, a 5F system's purpose is to provide answers to questions the way that the SME would have.

To understand the 5F language you'll need to understand the five "F" concepts: "Functions, Factors, Families, Filiations and Features".

Functions:

The questions that a 5F system will answer are always in the form of Functions. Functions are small pieces of logic that are "evaluated" to provide an answer when (optionally) given input parameters. Each and every function is uniquely named and identifiable in 5F by that function name. As you'll see later, the name of the function also characterizes a function and gives it its meaning.

Functions will always "return" an answer that takes the form of a single Boolean value (either True or False) and is the outcome of the function's evaluation.

Figure 6:
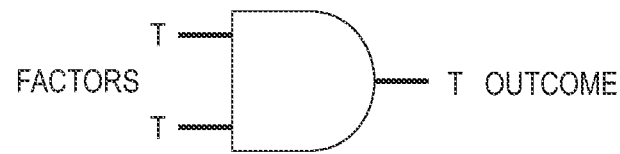
FIG. 6 is an example of a gate function, i.e., an instance that returns a TRUE from a logic evaluator, according to an exemplary embodiment of this disclosure.

In FIG. 6, you'll see the symbol of a function that returns TRUE because both of its input parameters are TRUE.

The goal is to answer a question. Functions are used to accomplish that and the outcome will always be a Boolean value. In other words, when evaluated, a function's value is its outcome and is either true or false.

Factors:

The "input parameter(s)" to a function are called its Factors. Factors are the specific things that the function will use to arrive at an answer when the function is evaluated. Note that not all function types require factors as further discussed below, i.e., "a function evaluates to either true or false, depending on its factors."

Factors are statically associated with functions in current 5F systems. That is, the association of a function to its significant factors happens most often when the function is created and saved, but they can be changed later. In addition, there are always a special purpose factor that is passed-in dynamically to all functions at the time each function is evaluated. That factor is called the "Scope Factor". For example, it might be desired to have a function that evaluates to true if the scope factor is "blue" and false if it is not.

Figure 7:
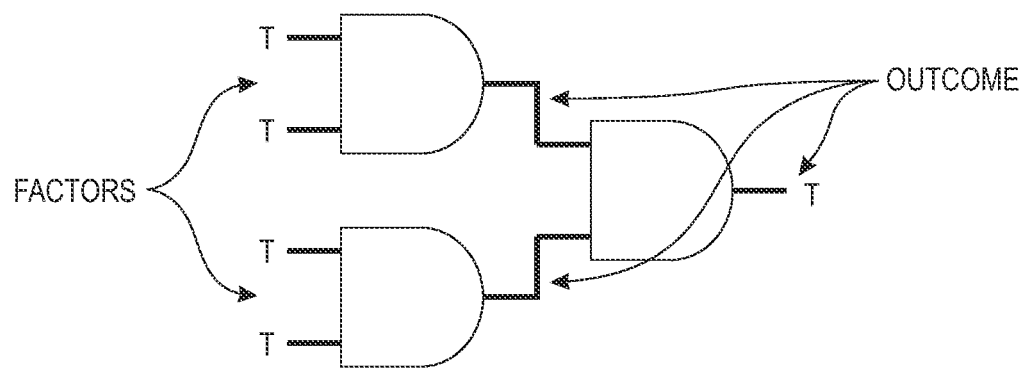
FIG. 7 is an example of a logic schema represented by a plurality of combined instances stored in a knowledge base according to an exemplary embodiment of this disclosure.

Functions versus Factors:

With reference to FIG. 7, functions use factors as their input parameters during evaluation and in 5F, all factors are functions, and any function can be a factor. This is possible because any function's input parameters are always functions themselves being used as a factor. Factors are just functions being used by some other function because they are significant to the evaluation of the function. This is how functions are combined together and allows the answering of very complex questions, where many different factors are evaluated by creating functions that use other functions for its significant factors.

In 5F, there are only 3 categories of functions: Observations, Subjects and Gates.

Observation functions—these functions represent an external truth. They evaluate a specific statement, written in C#, and have no significant factors as input parameters but have access through C# objects to the passed-in scope factor, the passed-in workspace and the function that is evaluating the observation function as a factor. They are most often used as a factor in a gate function (below). A observation function is a small algorithm that enables the processing of arbitrary C# programming logic. Observation functions say what is true or false, independently of any other function in the system.

For example, an observation function can be written who's outcome would be:
true if the current day is a weekday
false if the current time is before 7 am but after 10 pm
true if the last time this customer [identified by the scope factor (see below)] called in was less than 30 minutes ago
return true then add a function as a factor to another function (a side-effect!)

Subject functions represent the notion that the subject is itself the scope factor. Subject functions evaluate only the passed-in scope factor and will return true only if the passed-in scope factor is "itself". Subject functions have no factors as input parameters. When used as a significant factor in a gate function (below), a subject function is almost always a representation of some tangible entity in the real or virtual world. That is, it usually represents a "thing" of some sort. The "type of thing" is based on the family that it is in (more about this later) and its "given name" is usually its identity in the world that exists in.

For example, a subject function can be created to represent a specific device or specific person. It would evaluate to true if the scope factor was that specific device or person.

Subject functions allow gate functions (below) to know the identity of the scope factor, if applicable. The special use of the scope factor by a gate function to identify the specific subject factor "by name" permits rapid subject factor evaluation even with a very large number of subjects associated as factors to a function.

Gate functions—the most versatile of the function types! Gate functions keep a collection of significant factors and apply Boolean logic to evaluate those factors one by one following its specific "Boolean Evaluation Mode" attribute in order to determine an answer. That is, all of the Boolean outcomes of the individual factor function's evaluations are considered together as a group using either AND, OR, XOR, NAND, NOR or XNOR Boolean logic as its evaluation mode to arrive at a true or false answer for the function. Gate functions control and apply Boolean logic across all of the functions that are its factors. Their ability to evaluate factor functions enables very complex questions to be answered.

For example, a gate function can be crafted to:
evaluate to true only if 4 other specific functions are all true, i.e., a logical AND evaluation mode;
represent a certain significant feature such that its evaluation of true means something about the passed-in scope factor;
evaluate to true if the scope factor is included among its 10 million factors; and
group together the evaluation of several other functions such that an evaluation of true means that the passed-in scope factor has some particular right or permission.

The normal order for backward chaining evaluation of factor functions in a gate function is:
1. Evaluate the assumption functions and the scope factor function, if they are also factors otherwise. Assumption factors always have their stated outcome and the scope factor function is assumed to be true. The search for each scope by name occurs first and assumption factors are not considered unless they are found to be factors of the evaluating function.
2. Evaluate all observation functions.
3. Evaluate all gate functions.
4. No subject functions are evaluated or considered at all except for any subject function that is also part of the scope function.

Evaluation ends as soon as the function's logical outcome is determined.

Functions remember their outcomes for each request to eliminate unnecessary re-evaluations when the outcomes can't change. Because of this "memory", any evaluation that is attempted on a function that is already in the process of being evaluated (as in a "loop") but not yet completed evaluation will always have an outcome of FALSE to prevent an "endless loop" condition from occurring.

Backward Chaining Evaluation: The scope factor represents the "focus" for the evaluation of each function. While a scope factor is most often a subject function, this is not a requirement. The scope factor can be any of the three function types. For backward chaining evaluation the scope factor functions, if it is also a factor, otherwise, it will be assumed to be true. Likewise, all of the assumption functions are assumed to have their stated outcomes. Both of these default outcomes occurs before any of the factors for a particular function are evaluated.

Forward Chaining Evaluation: The scope factor continues to represent the "focus" for the evaluation of each function. As with backward chaining evaluation, while the scope factor is most often a subject function, this is not a requirement. The scope factor can be any of the three function types. Unlike backward chaining evaluation, in forward chaining evaluation the scope factor functions, if it is also a factor otherwise, it will be evaluated to an outcome. The assumption functions are still assumed to have their stated outcomes. All of these outcomes occur before any of the factors for a particular function are evaluated.

Function Symbols

In 5F, functions and their related factors are written in a 2 dimensional schematic logic diagram style using several symbols to represent the functions with simple lines representing the factor-to-function relationships of those functions.

Figure 8:
FIG. 8 is an example of an observations/subject schematic logic symbol according to an exemplary embodiment of this disclosure.

FIG. 8 shows the symbol that represents both observation and subject functions. The line with the tiny circle on the right side represents its evaluation outcome.

Figures 9, 10:
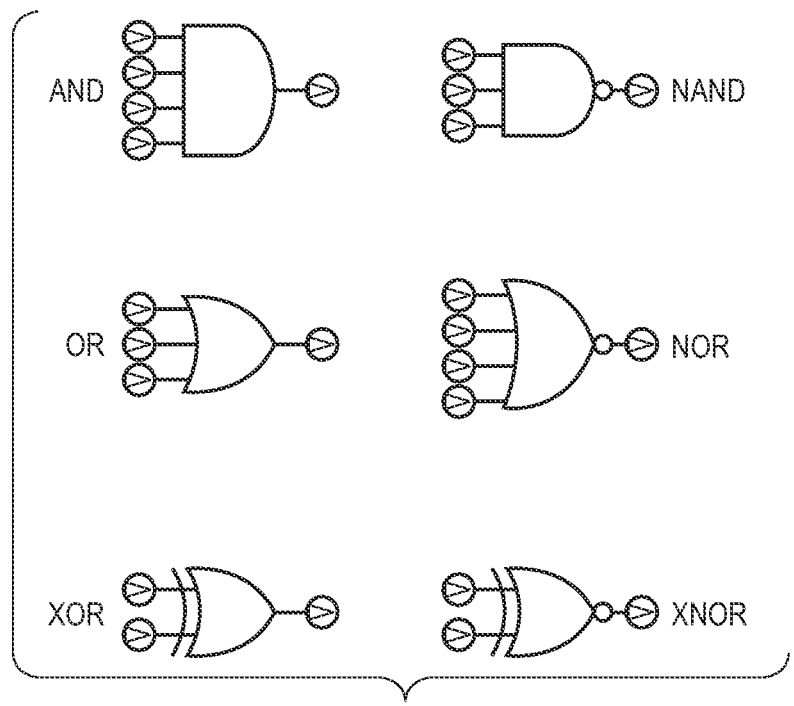
FIG. 9 is examples of Boolean logic symbols used to connect a plurality of instances according to an exemplary embodiment of this disclosure.
FIG. 10 is an example of a tree-like hierarchical structure for naming instances according to an exemplary embodiment of this disclosure.

FIG. 9 shows the symbols that represent the 6 possible gate functions, determined by the function's evaluation mode. As with observation and subject symbols, the single line and tiny circle on the right side of each symbol represents its evaluation outcome. The lines with tiny circles on the left side of the symbols represent the input parameters of the function: its factors.

Gate functions can have any number of factors. For example, in FIG. 12, the "AND" gate has 4 factors. The "OR" gate has 3 factors and the "XNOR" gate has 2 factors.

Note the extra small but darker circle on the right side of the "NAND", "NOR" and "XNOR" gate function symbols. These small circles represent the notion that the usual true or false outcome is inverted and is false instead of true, and true instead of false. For example, where an "AND", "OR" or "XOR" gate would be true for a set of factors, a "NAND", "NOR" or "XNOR" gate would be false.

As discussed above, functions hold all of the logic as well as all of the representations that are needed to answer questions. Functions are created in 3 basic types, can be combined to handle complex questions, and any function can be used as a scope factor. The scope factor identifies the first factor function of its type to be evaluated in a gate function. Subject functions only return true if they are the scope factor. Observation functions return true or false depending on their C# code. Gate functions provide a way to combine functions together and have specific ways of being evaluated to get a true or false outcome.

Families:

Functions are managed through the concept of Families. Families represent the naming convention that is followed so that a user is aware of what a function does and what it means. Families are the starting point in the creation of any new function.

As discussed, there are 3 different types of functions and likewise there are 3 different root families: one root each for Observation, Subject and Gate function types. These 3 families establish the root level of a tree of related family branches where descendant branches of the family inherit their initial meaning from their ancestral families.

For example, as shown in FIG. 10, the root family for Subject functions could branch into "External" and "Internal" descendant family branches, and each of those could further branch into "Asset" and "User" descendant branches of the Subject family, and so on.

The "distinguished name" (or full name) of any branch of a family includes all its ancestral family names which guarantees uniqueness in the names. So, for example, the "Subject.Internal.Asset" branch of the Subject family is distinguishable from the "Subject.External.Asset" branch. Each family's distinguished name provides meaning, identifies the family's purpose and simplifies the management of a potentially large number of functions. For example, 4 "generations" of families branching out from the Subject root family could manage 100 million unique Subject functions with no more than 100 descendant families from any single branch of the family tree.

The relationship of a family to its ancestral family creates indirect relationships to other families. For example, all of the families created from a single family are siblings to one another; families created from sibling families are cousins, etc. Sibling families never have the same name.

Each new function created in a family is named by the branch of that family and inherits meaning from that family branch. In this way, functions are not unlike the leaves on the branches of a tree. Every function's distinguished name consists of a family name, a colon ":" and finally that function's given name. The given name is unique in that function's immediate family: sibling functions cannot have the same name.

For example, using the simple family tree of FIG. 10, the distinguished name for a new "Subject.External.User" function representing me ("XRXNA\US00P01J") could be "Subject.External.UserXRXNAWS00P01J", and a new distinguished name for a function of the "Subject.Internal.Asset" family representing our local printer ("GBP086011N") could be "Subject.Internal. Asset:GBP086011N".

Notably, the distinguished names "Subject.External.User:XRXNA\ US00P01J" and "Subject.Internal.Asset: GBP086011N" aren't the names of new family branches, they're the names of a new functions (note the colon ":" in the names) . . . the leaves on a branch of a family tree.

The system always treats the functions in the above examples as subject functions because they are descendants of the root "Subject" family. But the additional meaning (e.g. "External" or "Asset") comes from the branch of the family that they are in and that they are named for.

New family branches are created as a way to provide lasting and unique meaning to the functions that are created. For example, "XRXNA\US00P01J" is simply a name and has little specific meaning. But "Subject.External.User: XRXNA\US00P01J" is clearly the name of a function that refers to a specific external user whose ID is XRXNA\US00P01J.

Notably, the meaning of a function is captured and preserved in the function's distinguished name and, because of that, it inherits meaning from the branch of the family tree that it is a part of. As with families, the relationship of a function to its family creates indirect relationships to other functions. For example, all of the functions of a single family are siblings to one another; the functions of sibling families are cousins, etc. Also, the relationship between a function and the single branch of a tree that it is created in (its family) is completely different from the relationship that functions have with the other functions that are its factors or the functions that it may be a factor of. Functions are always created in only one unique family and that family name becomes a part of the name of the function and gives it meaning. But functions may be used as factors to any number of other functions and such use does not determine its meaning but does determine how and when it is evaluated.

The single "family relationship" of a function is unique and it's that relationship that provides most of its meaning. The relationships between a function and its factors are not unique and it's those relationships that define the outcomes of the function during evaluation.

All of the "factor-to-function relationships" of a function, either as a factor to a function or by having a function as a factor, are called "Filiation Relationships" or "Filiations".

Filiations

A Filiation is a different type of relationship as compared to a family relationship. As was previously described, a family relationship begins when a function is created, before any factor functions are decided upon. That is, a function is a part of a branch of a family immediately at its "birth". But a filiation is not established until the moment that one function is chosen to be a factor for another function. A filiation is a "peer" relationship in that both functions are filiations to each other, even though one function is a factor to the other.

A filiation can be conceptualized as the association between two filiation functions. It is static and exists regardless of any evaluation. By analogy, a filiation is like a phone line between the filiation functions and the evaluation outcome from a factor function is like a phone call traveling down that wire, from one filiation to the other.

Figure 11:
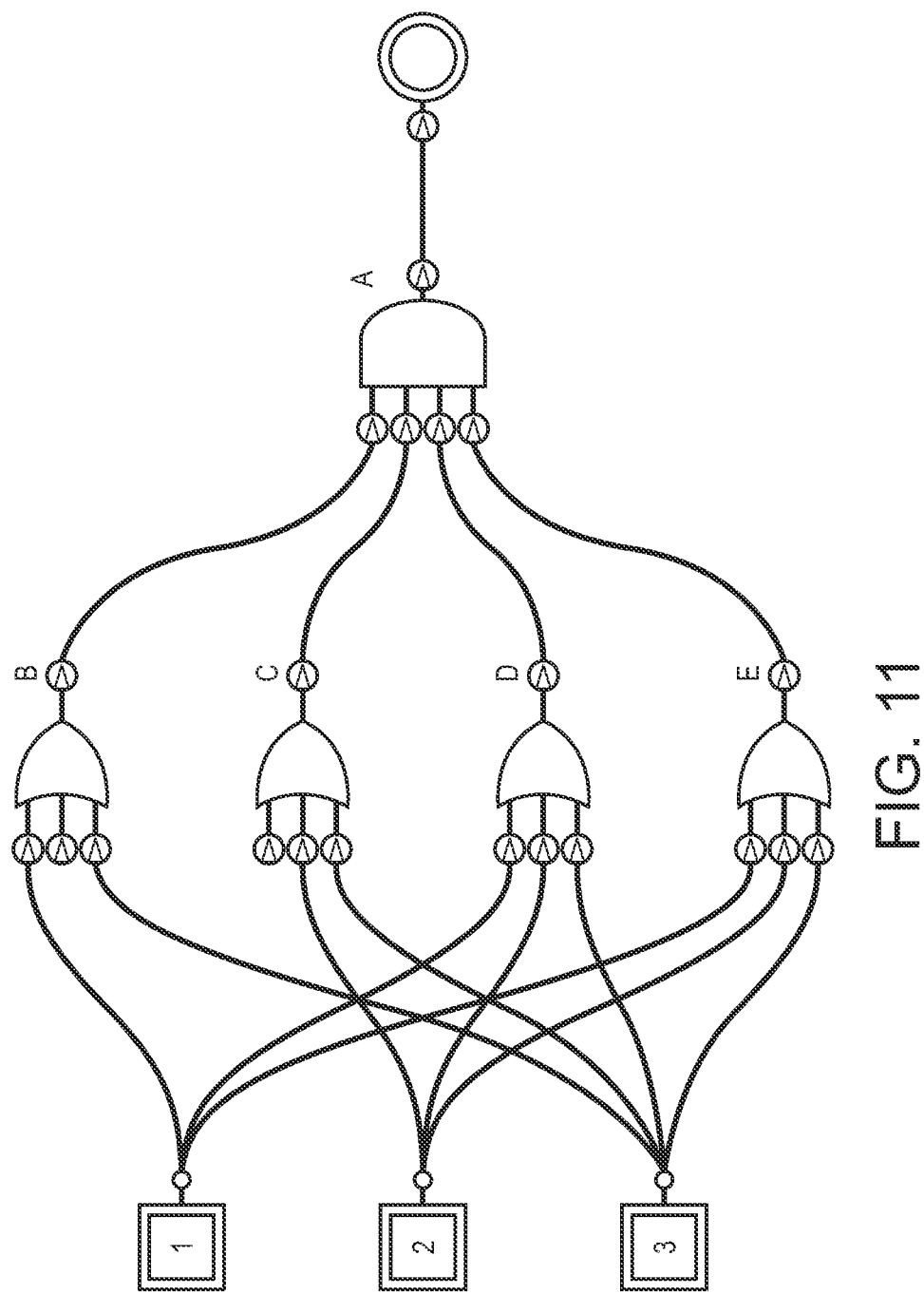
FIG. 11 is an example of a logic schema represented as instances stored in a knowledge base and evaluated according to an exemplary embodiment of this disclosure.

With reference to FIG. 11, illustrated is an example of a logic schema represented as instances stored in a knowledge base and evaluated according to an exemplary embodiment of this disclosure.

FIG. 11 includes many functions and the discussion below begins on the right at the outcome and moves to the left.

On the far right there is a large circle representing a final "outcome". To the left of that outcome symbol is an "AND" gate function symbol labeled "A" with 4 required factors. The factor functions are all "OR" gate function symbols, each with 2 or 3 factors themselves, labeled "B", "C", "D" and "E". In addition, there are also 3 observation functions to the left of the "OR" functions labeled "1", "2" and "3".

Notably, the lines that are drawn that connect the "AND" gate function symbol to its 4 factor "OR" gate functions, and that connect those "OR" gate functions to their factor functions. These lines represent the filiations between these functions.

Referring again to the schematic of FIG. 11, A and B are filiations, A and C are filiations, but B and C aren't filiations because they have no factor-to-function relationships even though they both have filiations with A.

Understanding the concept of a filiation is a main point to understanding the logic behind 5F. As previously discussed, the outcome of one function can be a factor to another function. Since 1) "Factors are the specific things that the function will use to arrive at an answer when the function is evaluated" and 2) gate functions "apply Boolean logic to evaluate those factors one by one" then it becomes clear that a gate function's outcome is determined by its filiations.

With reference to FIG. 11, assume Observation Function 1 is true as a first example. Because Observation Function 1 is a factor for Gate Functions B, D and E, and because those Gate Functions are "OR" gates, Gate Functions B, D, and E are true. But, because Gate Function C is false, Gate Function A is false because Gate Function A is an "AND" gate.

In a second example, assume Observation Function 2 is true. Because Observation Function 2 is a factor for Gate Functions C, D and E, and because those Gate Functions are "OR" gates, Gate Functions C, D, and E are true. But, because Gate Function B is false, Gate Function A is still false.

In a third example, assume Observation Function 3 is true. Because Observation Function 3 is a factor for Gate Functions B, C, D and E, and because those Gate Functions are "OR" gates, Gate Functions B, C, D, and E are true and therefor Gate Function A is finally true.

The example schematic shown in FIG. 11 represents a logic schema that says "A is true for a True Observation Function 3, but false for a True Observation Function 1 or 2". Other functions in other schemas may be true for 1 or 2. For example, if the outcome of D or E was the focus, then we would say that "D and E are true for True Observation Functions 1, 2 and 3".

The purpose of this example is to show how the factors of a function determine its logic and how all of the filiations in a logic schema work together.

Features

When an entity is described in the real or virtual world, this is done in terms that represent something about that entity. For example, an entity has brown eyes, or is tall, or likes chicken soup.

In 5F, these things that represent something about an entity are called Features. The notion of a feature is similar to the notion of a property or a field, but they aren't exactly the same. Properties and fields hold information or data that is related to an object or a record. In contrast, Features are "OR" gate functions in 5F whose factor functions are said to "have that feature". Features represent the "significance" of a piece of information, not the information itself. They are logic and knowledge, not data and information.

For example, assume function "3" in FIG. 11 represents a person, not an observation. Therefore, it is a "subject" function. As such, it will return a true outcome only when the "scope factor" is this subject function. That is, the distinguished name of the scope factor matches the distinguished name of this subject function.

For this example, assume that function "3" has a distinguished name of "Subject.External.UserXRXNA\US00P01J" and this subject is a factor to 4 feature functions: B, C, D and E: B="Gate.Feature.Eye.Color.Blue"; C="Gate.Feature.Age.Old"; D="Gate.Feature.Gender.Male"; and E="Gate.Feature.Hair.Color.Brown". In addition, name function "A": A="Gate.System.IsAnAdministrator".

Filiations link these functions together to establish the logic: for this example, during evaluation, when given that the scope factor is Subject.External.UserXRXNAWS00P01 J:

the function Gate.Feature.Eye.Color.Blue is true;
the function Gate.Feature.Age.Old is true;
the function Gate.Feature.Gender.Male is true; and
the function Gate.Feature.Hair.Color.Brown is true.

These gate functions are all true because these are all "OR" gates that need only one factor to be true, and Subject.External.UserXRXNA\US00P01J is that one true factor. The knowledge represented by this logic is that the external user XRXNA\US00P01J's features include blue eyes, brown hair and that he is an old man.

Furthermore, Gate.System.IsAnAdministrator is also true because Gate.System.IsAnAdministrator is an "AND" gate, and all of its factor functions are true. The knowledge represented by this logic is that the external user XRXNA\US00P01J is an administrator. Furthermore, this knowledge is justified because of his blue eyes, brown hair and that he is an old man.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A functional logic abstraction layer system associated with acquiring domain knowledge associated with a plurality of application computing devices configured to request a factual query from the functional logic abstraction layer system, the functional logic abstraction layer system comprising:

a functional logic evaluator computer device;
a functional logic knowledge storage device;
at least one data resource device; and
at least one network operatively connecting the plurality of application computing devices, the functional logic knowledge storage device and the at least one data resource device, the functional logic evaluator computer device including a knowledge base storage system including:
a common memory which stores a knowledge base and a knowledge base management system which includes instructions for adding instances to the knowledge base and querying the knowledge base; and
a processor configured to execute the instructions,
wherein the knowledge base is configured as a functional logic knowledge (FLK) repository storing compiled Boolean information representing data included in the FLK repository and a logic for interpreting the data, the FLK repository including a common data table for both factual data and associated logical knowledge, the common data table including a plurality of rows of distinctly named instances, the distinctly named instances including one or more subject instances identifying an entity, one or more observation instances providing an external current truth as true or false, each observation instance including computer code executed by a process external to the FLK repository to detect the external current truth which is true at times and false at other times, and one or more gate instances specifying one of a plurality of Boolean logic operations to be performed by an operatively associated evaluator on two or more specified filiated other instances included in the common data table to provide a true output or a false output, each of the one or more gate instances including an associated group membership specifying the filiated other instances to use as factors to determine the true output or the false output of the gate instance and the operatively associated evaluator configured to execute the plurality of Boolean logic operations using one of a backward chaining logic evaluator and a forward changing logic evaluator;
wherein the knowledge base is stored in the common memory as compiled Boolean information representing data as factual knowledge and the logic for interpreting the data, the plurality of instances are individually named following a hierarchical taxonomy naming convention providing meaning by classification, the knowledge base system is configured using LDAP (Lightweight Directory Access Protocol), and the LDAP configured knowledge base system includes branch object types, subject object types, observation object types, gates object types and filiations object types; and
wherein the functional logic abstraction layer system interprets and processes the factual query requested from one of the application computing devices and provides a response to the requesting application computing device, the functional knowledge processing instructions inferring the response based on the knowledge base.

2. The knowledge base system according to claim 1, wherein the Boolean logic operations include one or more of AND, OR, XOR, NAND, NOR and XNOR operations.

3. A functional logic abstraction layer system associated with acquiring domain knowledge associated with a plurality of application computing devices configured to request a factual query from the functional logic abstraction layer system, the functional logic abstraction layer system comprising:
   a functional logic evaluator computer device;
   a functional logic knowledge storage device;
   at least one data resource device; and
   at least one network operatively connecting the plurality of application computing devices, the functional logic knowledge storage device and the at least one data resource device, the functional logic evaluator computer device including a knowledge base system including:
   a common memory including a knowledge base, the knowledge base configured as a functional logic knowledge (FLK) repository storing compiled Boolean information representing data included in the FLK repository and a logic for interpreting the data, the FLK repository including a common data table for both factual data and associated logical knowledge, the common data table including a plurality of rows of distinctly named instances, the distinctly named instances including a plurality of subject instances identifying an entity, a plurality of observation instances providing an external current truth specified as a true output or a false output, each observation instance including computer code executed by a process external to the FLK repository to detect the external current truth which is true at times and false at other times, and a plurality of gate instances specifying one of a plurality of Boolean logic operations to be performed on two or more filiated other instances specified by the gate instance, each of the gate instances including an associated group membership specifying the filiated other instances included in the common data table to use as factors to determine the true output or the false output of the gate instance;
   wherein the knowledge based is stored as compiled Boolean information representing data as factual knowledge and the logic for interpreting the data, the plurality of instances are individually named following a hierarchical taxonomy naming convention providing meaning by classification, the knowledge base system is configured using LDAP (Lightweight Directory Access Protocol), and the LDAP configured knowledge base system includes branch object types, subject object types, observation object types, gates object types and filiations object types; and
   the functional logic evaluator computer device configured to perform a logic evaluation of the knowledge base based on a query using one of a backward chaining logic evaluator and a forward chaining logic evaluator
   wherein the functional logic abstraction layer system interprets and processes the factual query requested from one of the application computing devices and provides a response to the requesting application computing device, the functional knowledge processing instructions inferring the response based on the knowledge base.

4. The knowledge base system according to claim 3, wherein the Boolean logic operations include one or more of AND, OR, XOR, NAND, NOR and XNOR operations.

* * * * *